Sept. 6, 1938.  W. H. FRANK ET AL  2,129,170
ELECTRICAL DISTRIBUTION SYSTEM
Filed May 7, 1936
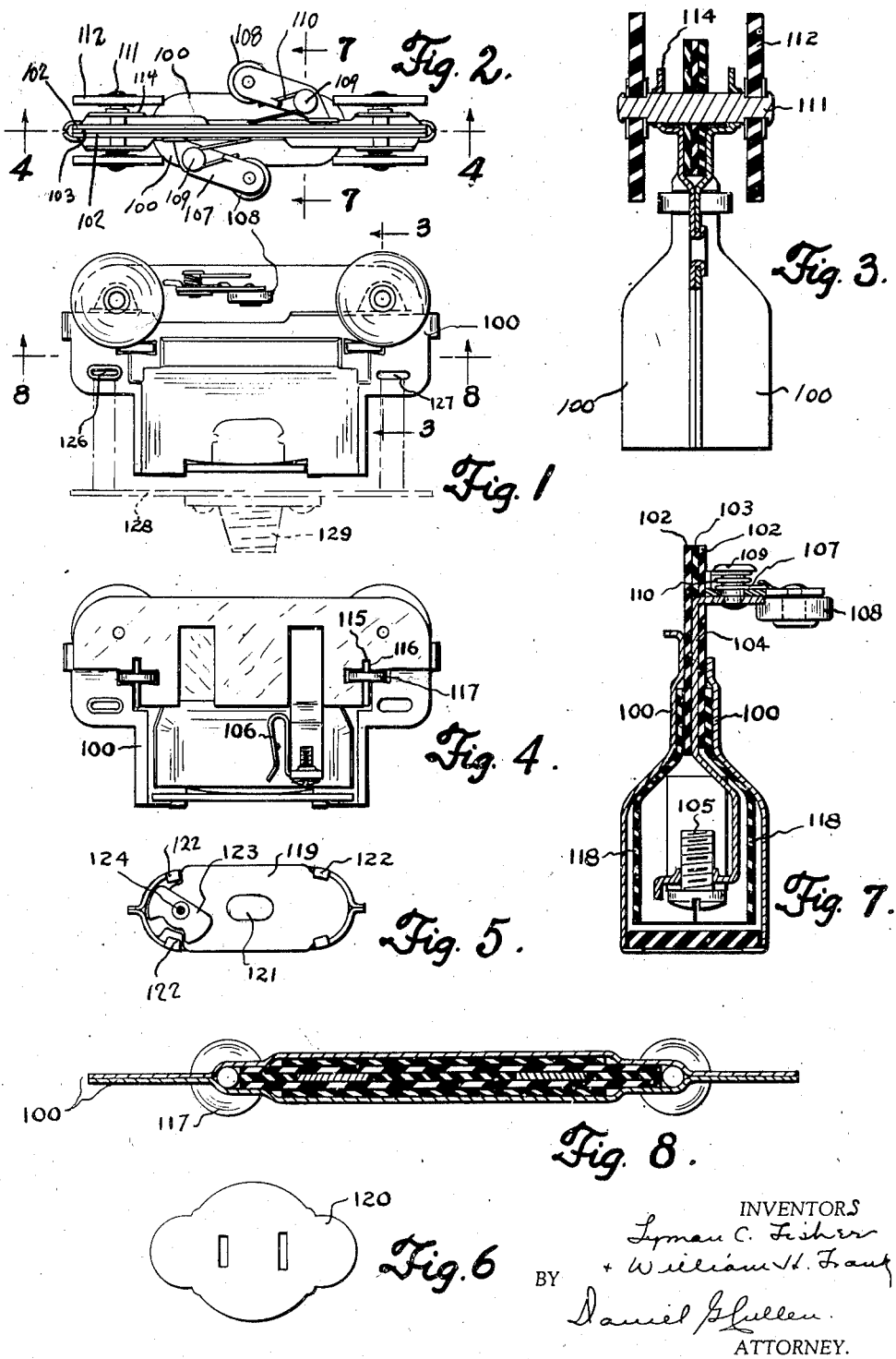
INVENTORS
Lyman C. Fisher
+ William H. Frank
BY
Daniel G. Cullen
ATTORNEY.

Patented Sept. 6, 1938

2,129,170

UNITED STATES PATENT OFFICE 2,129,170

ELECTRICAL DISTRIBUTION SYSTEM

William H. Frank and Lyman C. Fisher, Detroit, Mich.

Application May 7, 1936, Serial No. 78,330

9 Claims. (Cl. 191—45)

This application relates to the movable or connector and collector parts of electrical distribution systems of the trolley duct type, and discloses a novel trolley whose details of construction will readily be understood upon reference to the appended drawing illustrating these devices.

In the drawing,

Fig. 1 is an elevation view of the trolley;

Fig. 2 is a top plan view thereof;

Figs. 3 and 4 are sections as if on lines 3—3 and 4—4 of Figs. 1 and 2, respectively;

Fig. 5 is a bottom plan view of Fig. 4;

Fig. 6 shows a plate provided as an alternative to the plate shown in Fig. 5;

Figs. 7 and 8 are sections as if on lines 7—7 and 8—8 of Figs. 2 and 1, respectively.

The trolley of these figures comprises two sheet metal plates 100 which are spaced and insulated from each other by three insulation laminal or plates 102—103—102. Each plate 102 is apertured to permit the passage therethough of a portion of plate or strap 104 disposed in a slot or cutout of central plate 103 and whose lower end is formed with a binding screw 105 and also a spring contact 106 of the prong receiving type. On the upper end of each strap 104 is a plate 107 on whose free end is a roller contact 108, and each plate 107 is pivotally riveted to the strap 104 by means of a rivet 109 encircled by a spring 110 which tends to urge the rollers 108 away from each other and also tends to urge the plates 107 into intimate contact with the bent-over portions of the plates 104. Through holes in the plates 102—103 pass axles 111 on which are disc wheels 112, and these axles are journalled and supported in flanges 114 of the metal plates 100.

Aligned notches 115 in the plates 102—103 form seats for axles 116 on which are thrust rollers 117.

The plates 102—103 are clamped between and by the metal plates 100 to form a unitary assembly having suitable insulation characteristics but being sufficiently thin to ride in a slot of a duct.

The lower portions of the metal plates 100 are bulged outwardly as shown best at Figs. 3 and 7 to form housings for the terminals 105 and receptacle contacts 106 on the ends of the contact straps 104 and suitable insulation plates 118 are disposed in the bulged-out portions of the plates 100 to insulate the straps 104 and the receptacle parts from the plates, and if desired these insulation plates 118 may have portions underlying the screws 105. For closing the housing formed by the bulged-out portions of the plates 100 there may be provided a plate of insulation such as the one shown at 119, Fig. 5, or 120, Fig. 6. The plate of Fig. 5 has a central scoring 121 which may be knocked-out to provide a hole through which may be passed the terminals of the conductor adapted to be connected to the plates 104 by the binding screws 105, and the plate 119 is detachably held in closing position with respect to the housing by means of the clamped-over lugs 122 of the plates 100 and the swivel latch 123 pivotally riveted to the plate 119 at 124 and adapted to be rotatably slid under said lugs 122 to hold the plate 119 in place, removably so as to provide access to the screws 105. Since the plate 120 may not ordinarily be removed, it may be held in place merely by the clinched-over lugs 122 and is thus ordinarily not removable from the connector.

The two metal plates 100 are mutually secured by means of flanges 126 formed on each of them and projecting through and spun over slots 127 of the other of them, in the manner of a hollow rivet. These slots provide anchorages for loads supported by the device, and it will be observed that the points of anchorages provided by these slots are directly supported with respect to the supporting axles 111.

In Fig. 1 there is diagrammatically disclosed a U-shaped frame 128 having portions hooked over and seated in the slots 127 of the carriage, which frame is equipped with a fixture stud 129 whereby an electric fixture may be supported by the frame and thus by the carriage, with the supporting line centered with respect to the supporting rollers 112, whereby tilting or cocking of the carriage in the duct is automatically prevented by the weight of the load supported by the frame 128.

Now having described the trolleys of this application, reference will be had to the claims which follow for a determination of the protection sought by this application.

What we claim is:

1. A collector comprising an insulation carriage of thin flat plate form, bent plates having parts embedded within the carriage and projecting longitudinally beyond an edge thereof to provide adjacent exposed ends at such edge and also projecting transversely from opposite sides of the carriage to provide exposed oppositely projecting ends at such opposite sides, side roller contacts on the last mentioned exposed ends, and a housing depending from the aforementioned edge of the carriage and having an enlarged portion below such edge and surrounding the exposed ends at such edge, and having a restricted portion embracing that part of the carriage in which are embedded parts of the plates, the edges of the restricted portion of the housing, remote from the enlarged portion of the housing, having integral flanges, an axle passing transversely through and thus supported by said flanges and the carriage, and supporting rollers on the ends of the axle.

2. A collector comprising an insulation carriage of thin flat plate form, bent plates having parts embedded within the carriage and projecting longitudinally beyond an edge thereof to provide adjacent exposed ends at such edge and also projecting transversely from opposite sides of the carriage to provide exposed oppositely projecting ends at such opposite sides, side roller contacts on the last mentioned exposed ends, and a housing depending from the aforementioned edge of the carriage and having an enlarged portion below such edge and surrounding the exposed ends at such edge, and having a restricted portion embracing that part of the carriage in which are embedded parts of the plates, the edges of the restricted portion of the housing, remote from the enlarged portion of the housing, having integral flanges, an axle passing transversely through and thus supported by said flanges and the carriage, and supporting rollers on the ends of the axle, the enlarged portion of the housing being open sided to provide access to the exposed ends of the plates therewithin, these being formed as terminal binding means, and a quick detachable cover for the open side of the housing.

3. A collector comprising an insulation carriage of thin flat plate form made of laminae of insulation material, bent plates having parts embedded within the carriage and projecting longitudinally beyond an edge thereof to provide adjacent exposed ends at such edge and also projecting transversely from opposite sides of the carriage to provide exposed oppositely projecting ends at such opposite sides, side roller contacts on the last mentioned exposed ends, and a housing depending from the aforementioned edge of the carriage and having an enlarged portion below such edge and surrounding the exposed ends at such edge, and having a restricted portion embracing that part of the carriage in which are embedded parts of the plates, the edges of the restricted portion of the housing, remote from the enlarged portion of the housing, having integral flanges, an axle passing transversely through and thus supported by said flanges and the carriage, and supporting rollers on the ends of the axle.

4. A collector comprising an insulation carriage of thin flat plate form, bent plates having parts embedded within the carriage and projecting longitudinally beyond an edge thereof to provide adjacent exposed ends at such edge and also projecting transversely from opposite sides of the carriage to provide exposed oppositely projecting ends at such opposite sides, side roller contacts on the last mentioned exposed ends, and a housing depending from the aforementioned edge of the carriage and having an enlarged portion below such edge and surrounding the exposed ends at such edge, and having a restricted portion embracing that part of the carriage in which are embedded parts of the plates, the edges of the restricted portion of the housing, remote from the enlarged portion of the housing, having integral flanges, an axle passing transversely through and thus supported by said flanges and the carriage, and supporting rollers on the ends of the axle, axles within the carriage and having side thrust rollers thereon, the carriage and the restricted portion of the housing having cutouts through which project the rollers.

5. A collector comprising an insulation carriage of thin flat plate form made of laminae of insulation material, bent plates having parts embedded within the carriage and projecting longitudinally beyond an edge thereof to provide adjacent exposed ends at such edge and also projecting transversely from opposite sides of the carriage to provide exposed oppositely projecting ends at such opposite sides, side roller contacts on the last mentioned exposed ends, and a housing depending from the aforementioned edge of the carriage and having an enlarged portion below such edge and surrounding the exposed ends at such edge, and having a restricted portion embracing that part of the carriage in which are embedded parts of the plates, the edges of the restricted portion of the housing, remote from the enlarged portion of the housing, having integral flanges, an axle passing transversely through and thus supported by said flanges and the carriage, and supporting rollers on the ends of the axle, axles within the carriage and having side thrust rollers thereon, the carriage and the restricted portion of the housing having cutouts through which project the rollers.

6. A collector comprising an insulation carriage of thin flat plate form, bent plates having parts embedded within the carriage and projecting longitudinally beyond an edge thereof to provide adjacent exposed ends at such edge and also projecting transversely from opposite sides of the carriage to provide exposed oppositely projecting ends at such opposite sides, side roller contacts on the last mentioned exposed ends, and a housing depending from the aforementioned edge of the carriage and having an enlarged portion below such edge and surrounding the exposed ends at such edge, and having a restricted portion embracing that part of the carriage in which are embedded parts of the plates, the edges of the restricted portion of the housing, remote from the enlarged portion of the housing, having integral flanges, an axle passing transversely through and thus supported by said flanges and the carriage, and supporting rollers on the ends of the axle, hollow rivets at opposite ends of the restricted portion of the housing for intersecuring the parts of such restricted portion and for providing lined holes or bearings in such restricted portion for load supports.

7. A collector comprising an insulation carriage of thin flat plate form, bent plates having parts embedded within the carriage and projecting longitudinally beyond an edge thereof to provide adjacent exposed ends at such edge and also projecting transversely from opposite sides of the carriage to provide exposed oppositely projecting ends at such opposite sides, side roller contacts on the last mentioned exposed ends, and a housing depending from the aforementioned edge of the carriage and having an enlarged portion below such edge and surrounding the exposed ends at such edge, and having a restricted portion embracing that part of the carriage in which are embedded parts of the plates, the edges of the restricted portion of the housing, remote from the enlarged portion of the housing, having integral flanges, an axle passing transversely through and thus supported by said flanges and the carriage, and supporting rollers on the ends of the axle, the ends of the restricted portion of the housing being extended beyond the plate form carriage and being directed towards the center of the carriage to form bumpers therefor.

8. A collector comprising an insulation carriage of thin flat plate form, bent plates having parts embedded within the carriage and projecting longitudinally beyond an edge thereof to provide adjacent exposed ends at such edge and also projecting transversely from opposite sides of the carriage to provide exposed oppositely projecting ends at such opposite sides, side roller contacts on the last mentioned exposed ends, and a housing depending from the aforementioned edge of the carriage and having an enlarged portion below such edge and surrounding the exposed ends at such edge, and having a restricted portion embracing that part of the carriage in which are embedded parts of the plates, the edges of the restricted portion of the housing, remote from the enlarged portion of the housing, having integral flanges, an axle passing transversely through and thus supported by said flanges and the carriage, and supporting rollers on the ends of the axle, hollow rivets at opposite ends of the restricted portion of the housing for intersecuring the parts of such restricted portion and for providing lined holes or bearings in such restricted portion for load supports, the ends of the restricted portion of the housing being extended beyond the plate form carriage and being directed towards the center of the carriage to form bumpers therefor.

9. A collector comprising an insulation carriage of thin flat plate form made of laminae of insulation material, bent plates having parts embedded within the carriage and projecting longitudinally beyond an edge thereof to provide adjacent exposed ends at such edge and also projecting transversely from opposite sides of the carriage to provide exposed oppositely projecting ends at such opposite sides, side roller contacts on the last mentioned exposed ends, and a housing depending from the aforementioned edge of the carriage and having an enlarged portion below such edge and surrounding the exposed ends at such edge, and having a restricted portion embracing that part of the carriage in which are embedded parts of the plates, the edges of the restricted portion of the housing, remote from the enlarged portion of the housing, having integral flanges, an axle passing transversely through and thus supported by said flanges and the carriage, and supporting rollers on the ends of the axle, axles within the carriage and having side thrust rollers thereon, the carriage and the restricted portion of the housing having cutouts through which project the rollers, hollow rivets at opposite ends of the restricted portion of the housing for intersecuring the parts of such restricted portion and for providing lined holes or bearings in such restricted portion for load supports, the ends of the restricted portion of the housing being extended beyond the plate form carriage and being directed towards the center of the carriage to form bumpers therefor.

WILLIAM H. FRANK.
LYMAN C. FISHER.